United States Patent
Kalai et al.

(10) Patent No.: US 9,940,106 B2
(45) Date of Patent: *Apr. 10, 2018

(54) GENERATING PROGRAMS USING CONTEXT-FREE COMPOSITIONS AND PROBABILITY OF DETERMINED TRANSFORMATION RULES

(71) Applicant: Microsoft Technology Licensing, LLC, Redmond, WA (US)

(72) Inventors: Adam Kalai, Cambridge, MA (US); Butler Lampson, Cambridge, MA (US); Sumit Gulwani, Bellevue, WA (US); Aditya Krishna Menon, San Diego, CA (US); Omer Tamuz, Jerusalem (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,622

(22) Filed: Jun. 21, 2016

(65) Prior Publication Data

US 2016/0299744 A1    Oct. 13, 2016

Related U.S. Application Data

(63) Continuation of application No. 13/530,138, filed on Jun. 22, 2012, now Pat. No. 9,400,639.

(51) Int. Cl.
*G06F 9/44* (2006.01)
*G06N 5/02* (2006.01)
(Continued)

(52) U.S. Cl.
CPC .............. *G06F 8/30* (2013.01); *G06N 5/025* (2013.01); *G06N 99/005* (2013.01);
(Continued)

(58) Field of Classification Search
None
See application file for complete search history.

(56) References Cited

U.S. PATENT DOCUMENTS

| 5,301,336 A | 4/1994 | Kodosky et al. |
| 5,920,717 A | 7/1999 | Noda |

(Continued)

OTHER PUBLICATIONS

"Final Office Action Issued in U.S. Appl. No. 13/530,138", dated Apr. 10, 2015, 18 Pages.
(Continued)

*Primary Examiner* — Abu Zar Ghaffari
(74) *Attorney, Agent, or Firm* — International IP Law Group, PLLC

(57) ABSTRACT

There is provided a method and system for generating a program. The method includes detecting a number of steps for performing a task on a computing device and detecting an example relating to each of the steps, wherein the example includes input data and corresponding output data relating to the step. The method also includes, for each example, determining a rule that transforms the input data to the corresponding output data based on cues including textual features within the input data and the corresponding output data. The method further includes generating a program for performing the task based on the rules.

17 Claims, 7 Drawing Sheets

(51) Int. Cl.
*G06N 99/00* (2010.01)
*G06F 17/22* (2006.01)
*G05B 19/042* (2006.01)

(52) U.S. Cl.
CPC .............. *G05B 19/0423* (2013.01); *G05B 2219/23246* (2013.01); *G06F 8/34* (2013.01); *G06F 17/2282* (2013.01)

(56) References Cited

U.S. PATENT DOCUMENTS

| | | | |
|---|---|---|---|
| 7,103,584 B2 * | 9/2006 | Lee | G06N 99/005 382/103 |
| 7,137,100 B2 | 11/2006 | Iborra et al. | |
| 7,149,347 B1 | 12/2006 | Wnek | |
| 7,272,822 B1 | 9/2007 | Riggins et al. | |
| 7,505,817 B2 | 3/2009 | McDaniel et al. | |
| 7,559,057 B2 | 7/2009 | Castelli et al. | |
| 7,801,835 B2 | 9/2010 | Bergman et al. | |
| 7,813,822 B1 * | 10/2010 | Hoffberg | G06K 9/00369 381/73.1 |
| 7,873,587 B2 | 1/2011 | Baum | |
| 8,095,488 B1 * | 1/2012 | Satish | G06N 7/005 706/12 |
| 8,099,715 B2 * | 1/2012 | Hisaki | G06F 8/10 717/120 |
| 2002/0026432 A1 * | 2/2002 | Kiji | G05B 13/0265 706/14 |
| 2004/0049388 A1 | 3/2004 | Roth et al. | |
| 2005/0108200 A1 | 5/2005 | Meik et al. | |
| 2005/0283758 A1 | 12/2005 | Cobcroft et al. | |
| 2007/0006139 A1 * | 1/2007 | Rubin | G06F 8/30 717/106 |
| 2007/0186156 A1 | 8/2007 | Bagare et al. | |
| 2009/0099982 A1 * | 4/2009 | Heuler | G06N 5/025 706/11 |
| 2009/0210364 A1 | 8/2009 | Adi et al. | |
| 2010/0037127 A1 | 2/2010 | Tomasic et al. | |
| 2010/0262839 A1 * | 10/2010 | Eker | G06F 21/14 713/190 |
| 2011/0302553 A1 | 12/2011 | Gulwani | |
| 2013/0185627 A1 | 7/2013 | Nakamura | |
| 2013/0346982 A1 | 12/2013 | Kalai et al. | |

OTHER PUBLICATIONS

"Non Final Office Action Issued in U.S. Appl. No. 13/530,138", dated Oct. 15, 2015, 18 Pages.

"Non Final Office Action Issued in U.S. Appl. No. 13/530,138", dated Nov. 5, 2014, 15 Pages.

"Notice of Allowance Issued in U.S. Appl. No. 13/530,138", dated Apr. 11, 2016, 12 Pages.

Gulwani, Sumit, "Automating String Processing in Spreadsheets Using Input-Output Examples", Retrieved at ://research.microsoft.com/en-us/um/people/sumitg/pubs/popl10-synthesis.pdf>> , PoPL, Jan. 26-28, 2011, pp. 13.

Fritz, et al., "Towards the Integration of Programming by Demonstration and Programming by Instruction using Golog", Retrieved citeseerx.isl.psu.edu/viewdoc/download?doi=10.1.1.170.5878& rep=rep1 &type=pdf>>, PAIR, Jul. 2010, pp. 07.

* cited by examiner

100

GENERATING PROGRAMS USING CONTEXT-FREE COMPOSITIONS AND PROBABILITY OF DETERMINED TRANSFORMATION RULES

CROSS-REFERENCE TO RELATED APPLICATIONS

This application is a continuation of U.S. patent application Ser. No. 13/530,138, filed Jun. 22, 2012, and entitled, "Generating Programs Using Context-Free Compositions and Probability of Determined Transformation Rules," the content of which is incorporated herein in its entirety by reference.

BACKGROUND

Users of computing devices often encounter situations in which it is desirable to perform unique data manipulation tasks. Such data manipulation tasks may involve manipulating or performing computations on specific input data to produce desired output data. However, writing computer programs to automate such data manipulation tasks may be difficult and time-consuming. Moreover, due to the potentially large quantity and complexity of the input data, performing such data manipulation tasks manually may not be feasible.

SUMMARY

The following presents a simplified summary of the embodiments described herein in order to provide a basic understanding of some aspects described herein. This summary is not an extensive overview of the claimed subject matter. It is intended to neither identify key or critical elements of the claimed subject matter nor delineate the scope of the embodiments described herein. Its sole purpose is to present some concepts of the claimed subject matter in a simplified form as a prelude to the more detailed description that is presented later.

An embodiment provides a method for generating a program. The method includes detecting a number of steps for performing a task on a computing device and detecting an example relating to each of the steps, wherein the example includes input data and corresponding output data relating to the step. The method also includes, for each example, determining a rule that transforms the input data to the corresponding output data based on cues including textual features within the input data and the corresponding output data. The method further includes generating a program for performing the task based on the rules.

Another embodiment provides a program generation system including a processor that is adapted to execute stored instructions and a system memory. The system memory includes code configured to detect a number of steps for performing a task and actual input data for the task. The system memory also includes code configured to detect an example relating to each of the steps, wherein the example includes input data and corresponding output data relating to the step. The system memory also includes configured to, for each example, determine a number of rules that transform the input data to the corresponding output data based on cues within the input data and the corresponding output data, rank the rules according to a probability that each rule will transform the actual input data to desired output data, and specify a rule to be used for performing a step represented by the example based on the ranking of the rules. The system memory further includes code configured to generate a program for performing the task based on the specified rules.

In addition, another embodiment provides one or more non-transitory, computer-readable storage media for storing computer-readable instructions. The computer-readable instructions provide a program generation system when executed by one or more processing devices. The computer-readable instructions include code configured to detect steps for performing a task and the actual input data for the task, and detect an input-output example relating to each step. The computer-readable instructions include code configured to, for each input-output example, determine suggested rules that define a transformation of input data to corresponding output data for the input-output example based on cues within the input data and the corresponding output data, rank the suggested rules according to a probability that each suggested rule will transform the actual input data to desired output data, and specify a rule to be used for performing a step of the task represented by the input-output example based on the ranking of the suggested rules. The computer-readable instructions further include code configured to generate a program for performing the task based on the specified rules.

The following description and the annexed drawings set forth in detail certain illustrative aspects of the claimed subject matter. These aspects are indicative, however, of but a few of the various ways in which the principles of the embodiments described herein may be employed, and the claimed subject matter is intended to include all such aspects and their equivalents. Other advantages and novel features of the claimed subject matter will become apparent from the following detailed description of the embodiments when considered in conjunction with the drawings.

DETAILED DESCRIPTION

Figure 1:
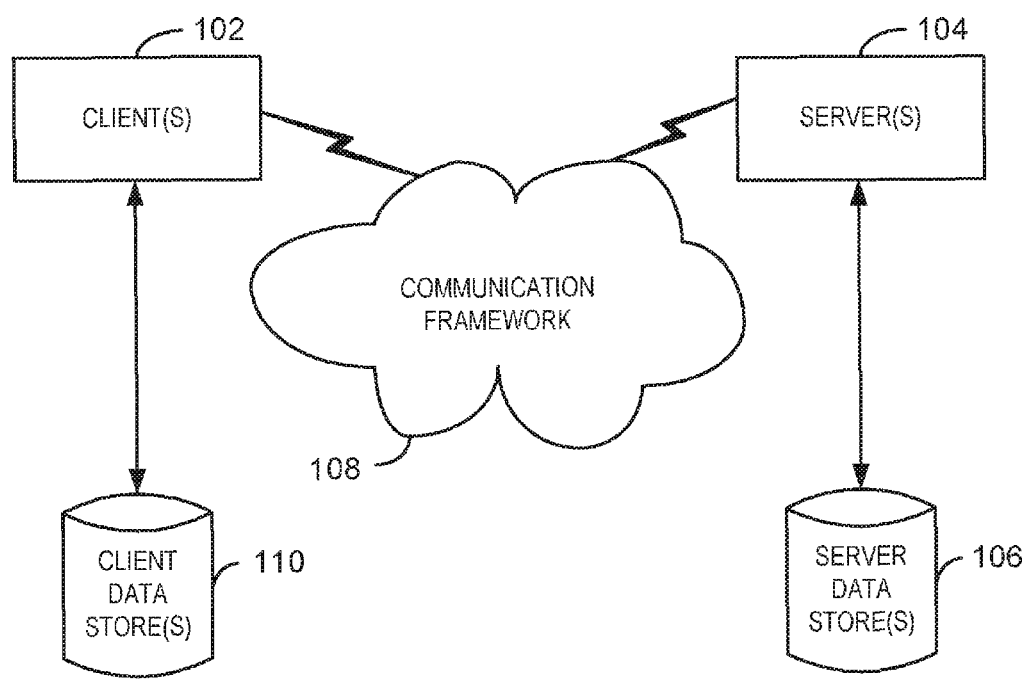
FIG. 1 is a block diagram of a networking environment in which a system and method for generating a program for performing a task may be implemented.

As a preliminary matter, some of the figures describe concepts in the context of one or more structural components, variously referred to as functionality, modules, features, elements, or the like. The various components shown in the figures can be implemented in any manner, for example, by software, hardware (e.g., discrete logic components, or the like), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As to terminology, the phrase "configured to" encompasses any manner in which any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, or the like, or any combinations thereof.

As used herein, terms "component," "system," "client," and the like are intended to refer to a computer-related entity, either hardware, software, e.g., in execution, or firmware, or any combinations thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combinations thereof to control a computer to implement the disclosed subject matter. The term "article of manufacture" as used herein is intended to encompass a computer program accessible from any non-transitory computer-readable device or media.

As used herein, the terms "component," "search engine," "browser," "server," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combinations thereof, to control a computer to implement the disclosed subject matter. The term "article of manufacture" as used herein is intended to encompass a computer program accessible from any non-transitory, computer-readable device, or media. Non-transitory, computer-readable storage media can include, but are not limited to, tangible magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not to be construed as preferred or advantageous over other aspects or designs.

Overview

According to programming by example (PBE) techniques, a user provides the computing device with an example of a task that is to be performed. From the example, the computing device attempts to infer the purpose of the task and creates a program for performing the task. PBE techniques may be used in a wide variety of domains, including the text processing domain. However, according to PBE techniques, it may be difficult to quickly search for programs composed of a set of base functions that are consistent with user-provided examples. This may be accomplished by making specific assumptions about the nature of the base functions, but this is unsatisfying because it limits the range of tasks that a user can perform.

In addition, programming by demonstration (PBD) techniques provide inference schemes that are based on machine learning. According to such techniques, a user may explicitly provide a sequence of actions to transform input data to output data. The learning procedure may then attempt to uncover the sequence of actions. However, such techniques may be complicated, since they may rely on hand-crafted probabilities for the inference procedure.

Embodiments described herein set forth a method and system for generating a program for performing a task or, more specifically, for automating repetitive tasks, such as text processing tasks, using machine learning. According to embodiments described herein, a user breaks a task into a series of individual steps. The user may also provide an example of the desired transformation for each step through examples including input data and corresponding output data. The examples may be mock examples that are based on hypothetical data, or may be authentic examples that are based on real data. The examples may provide succinct descriptions of non-trivial operations, such as sorting.

The user-defined examples may be used to determine a transformation for each step, wherein a transformation may be defined as compositions of rules in a probabilistic context free grammar. A probability that each rule results in a desired transformation of the data may be determined based on certain cues in the data. Such cues may include, for example, the existence of a date in the input data and the output data, the existence of a data string in the output data that is not present in the input data, or the existence of a matching number of lines in the input data and the output data, among others. Determining probabilities for the rules may allow for quick inference of an appropriate transformation describing the given input data and corresponding output data. The transformations for the individual steps may then be combined to create a program for performing the overall task.

Computing Environment

Figure 2:
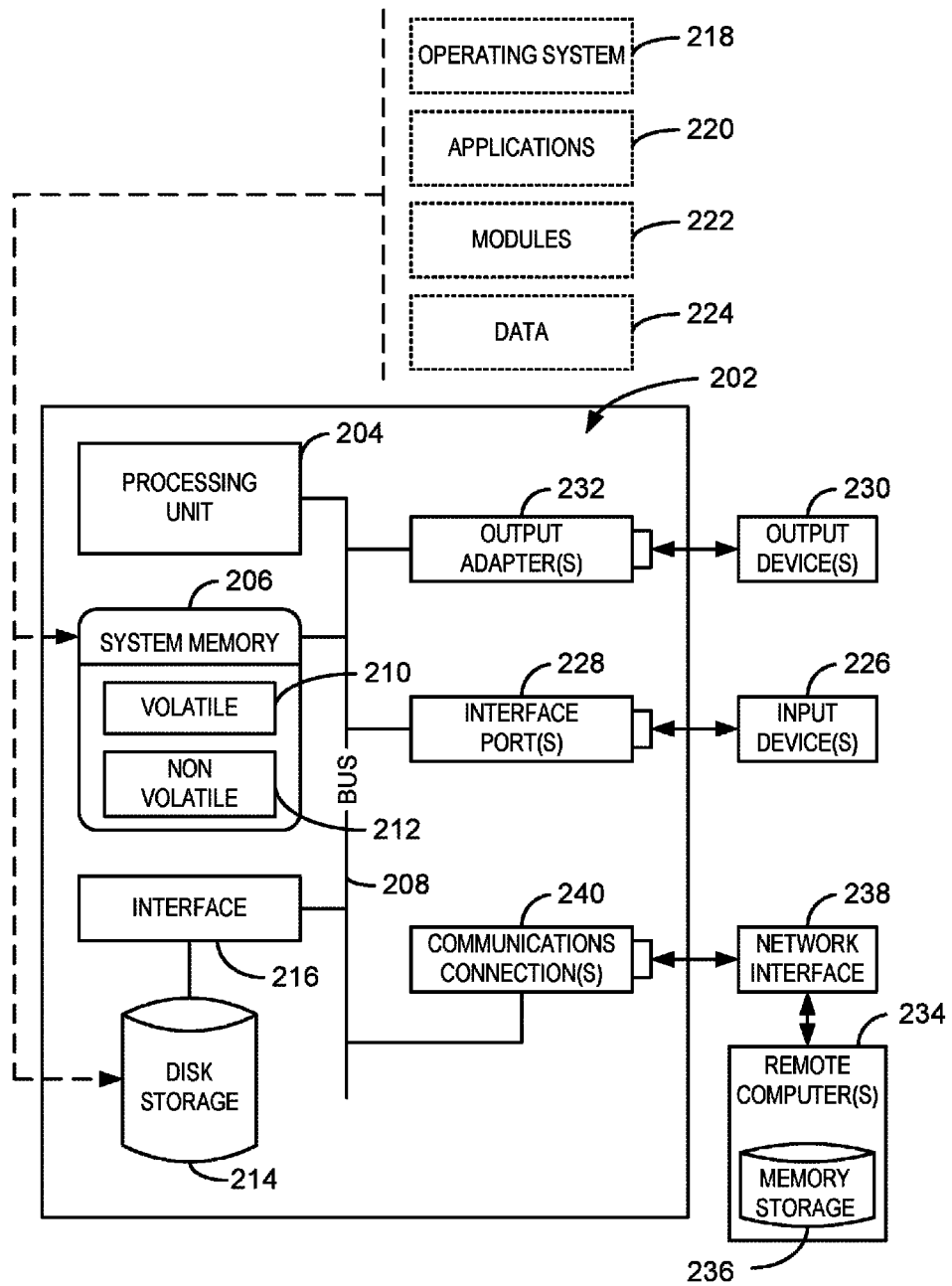
FIG. 2 is a block diagram of a computing environment that may be used to implement a system and method for generating a program for performing a task.

In order to provide context for implementing various aspects of the claimed subject matter, FIGS. 1-2 and the following discussion are intended to provide a brief, general description of a computing environment in which the various aspects of the embodiments described herein may be implemented. For example, a method and system for generating a program for performing a task can be implemented in such a computing environment. While the claimed subject matter has been described above in the general context of computer-executable instructions of a computer program that runs on a local computer or remote computer, those of skill in the art will recognize that the embodiments described herein also may be implemented in combination with other program modules. Generally, program modules include routines, programs, components, data structures, or the like, that perform particular tasks or implement particular abstract data types.

Moreover, those of skill in the art will appreciate that the embodiments described herein may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the embodiments described herein may be practiced on stand-alone computers. In a distributed computing environment, program modules may be located in local or remote memory storage devices.

FIG. 1 is a block diagram of a networking environment 100 in which a system and method for generating a program for performing a task may be implemented. The networking environment 100 includes one or more client(s) 102. The client(s) 102 can be hardware and/or software, e.g., threads, processes, or computing devices. The networking environment 100 also includes one or more server(s) 104. The server(s) 104 can be hardware and/or software, e.g., threads, processes, or computing devices. The servers 104 can house threads to perform search operations by employing the embodiments described herein, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s) 104 are operably connected to one or more server data store(s) 106 that can be employed to store information local to the servers 104.

FIG. 2 is a block diagram of a computing environment 200 that may be used to implement a system and method for generating a program for performing a task. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structures, including the memory bus or memory controller, a peripheral bus or external bus, or a local bus using any variety of available bus architectures known to those of ordinary skill in the art. The system memory 206 is non-transitory, computer-readable media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other non-transitory, computer-readable media, such as removable/non-removable, volatile/non-volatile computer storage media. FIG. 2 shows, for example, a disk storage 214. Disk storage 214 includes, but is not limited to, devices like a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 include, but are not limited to, a pointing device (such as a mouse, trackball, stylus, or the like), a keyboard, a microphone, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 can be a server hosting an event forecasting system in a networking environment, such as the networking environment 100, using logical connections to one or more remote computers, such as remote computer(s) 234. The remote computer(s) 234 may be client systems configured with web browsers, PC applications, mobile phone applications, and the like. The remote computer(s) 234 can be a personal computer, a server, a router, a network PC, a workstation, a microprocessor based appliance, a mobile phone, a peer device or other common network node and the like, and typically includes many or all of the elements described relative to the computer 202. For purposes of brevity, the remote computer(s) 234 is illustrated with a memory storage device 236. Remote computer(s) 234 is logically connected to the computer 202 through a network interface 238 and then physically connected via a communication connection 240.

Network interface 238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware/software employed to connect the network interface 238 to the system bus 208. While communication connection 240 is shown for illustrative clarity inside computer 202, it can also be external to the computer 202. The hardware/software for connection to the network interface 238 may include, for example, internal and external technologies such as mobile phone switches, modems including regular telephone grade modems, cable modems and DSL modems, ISDN adapters, and Ethernet cards.

Program Generation System

Figure 3:
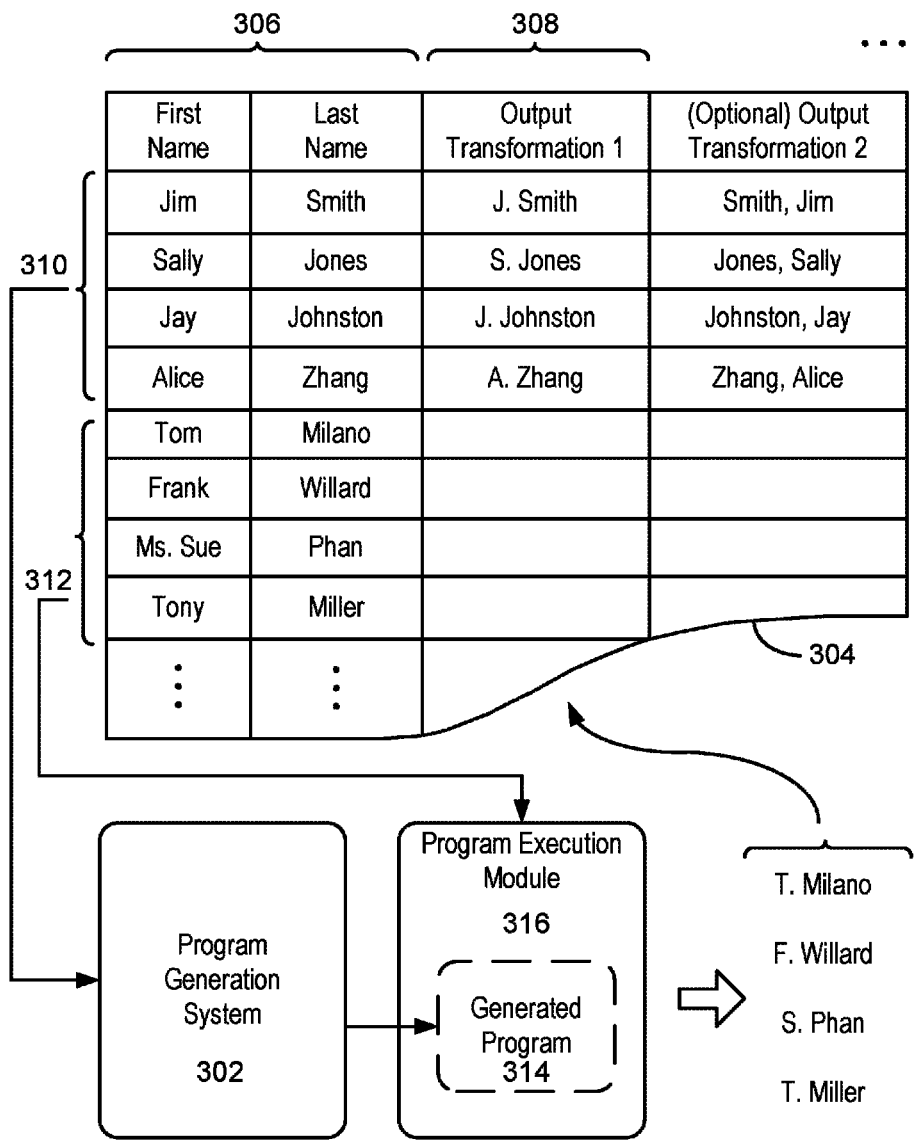
FIG. 3 shows an illustrative usage scenario for creating a program based on input-output examples using a program generation system.

FIG. 3 shows an illustrative usage scenario 300 for creating a program based on input-output examples using a program generation system 302. Each input-output example includes an input item and a corresponding output item. The input item may correspond to one or more string items, e.g., one or more text strings. The output item may also correspond to a string item. More specifically, each output item represents some type of transformation performed on a corresponding input item. In some embodiments, the transformation involves extracting a subset of characters from the text strings in the input item and/or concatenating such subsets to produce the output item. In other embodiments, the transformation involves formatting changes.

FIG. 3 presents an example of the concepts set forth above. In this case, the user provides a data set 304 that includes a collection of columns. The first two columns provide input items 306. Namely, a first column provides a list of the first names of customers. A second column provides a list of corresponding last names Thus, each input item 306 corresponds to a tuple of two string items. The input string items in the first two columns can be regarded as values of variables ($v_1$, $v_2$).

A third column presents output items 308. Namely, the third column represents name information culled from the first and second columns. The logic that underlies the transformation of an input item 306 to an output item 308 entails printing the first letter of the first name (in the first column), printing a period and a space, and printing the last name (in the second column), in its entirety.

In the particular scenario of FIG. 3, the user, or some other entity, has prepared a set of four input-output examples 310. Namely, a first input-output example maps the input tuple "Jim" and "Smith" into "J. Smith." A second input-output example maps the input tuple "Sally" and "Jones" into "S. Jones," and so on. The data set 304 also includes another set of untransformed input items 312 that do not yet have corresponding output items. Manually generating the output items for the set of untransformed input items 312 may be impractical due to the size and complexity of the data set 304.

In various embodiments, the program generation system 302 generates a program 314 that assists the user in transforming the set of input items 312 into a desired output form. From a high level perspective, the program generation system 302 generates the program 314 based on the set of input-output examples 310 using cues relating to the input items 306 and the corresponding output items 308. A program execution module 316 then applies the generated program 314 to the set of input items 312. This yields a set of new output items. For example, the program 314 automatically transforms the input item 306 including the tuple "Tom" and "Milano" into "T. Milano" In this case, it appears that the program generation system 302 has correctly surmised the logic that underlies the transformations in the set of input-output examples 310. That is, the program 314 appears to be operating by extracting the first letter of the first input string item ("T"), adding a period and space after the first letter, and then providing the second input string item "Milano" in its entirety.

In the above scenario, the program 314 converts a number of input string items into a single output item. However, the program generation system 302 can generate a second program to map the same input string items (corresponding to the first and last names of customers), or subset thereof, into another output item. For example, FIG. 3 shows that the data set 304 includes an optional fourth column that provides an additional collection of output items. An output item in the fourth column is formed by selecting the last name in the second column, adding a comma, followed by a space, followed by the first name as it appears in the first column Through this provision, the program generation system 302 can be used to map an arbitrary length tuple of string items into an arbitrary length tuple of output string items.

Figure 4:
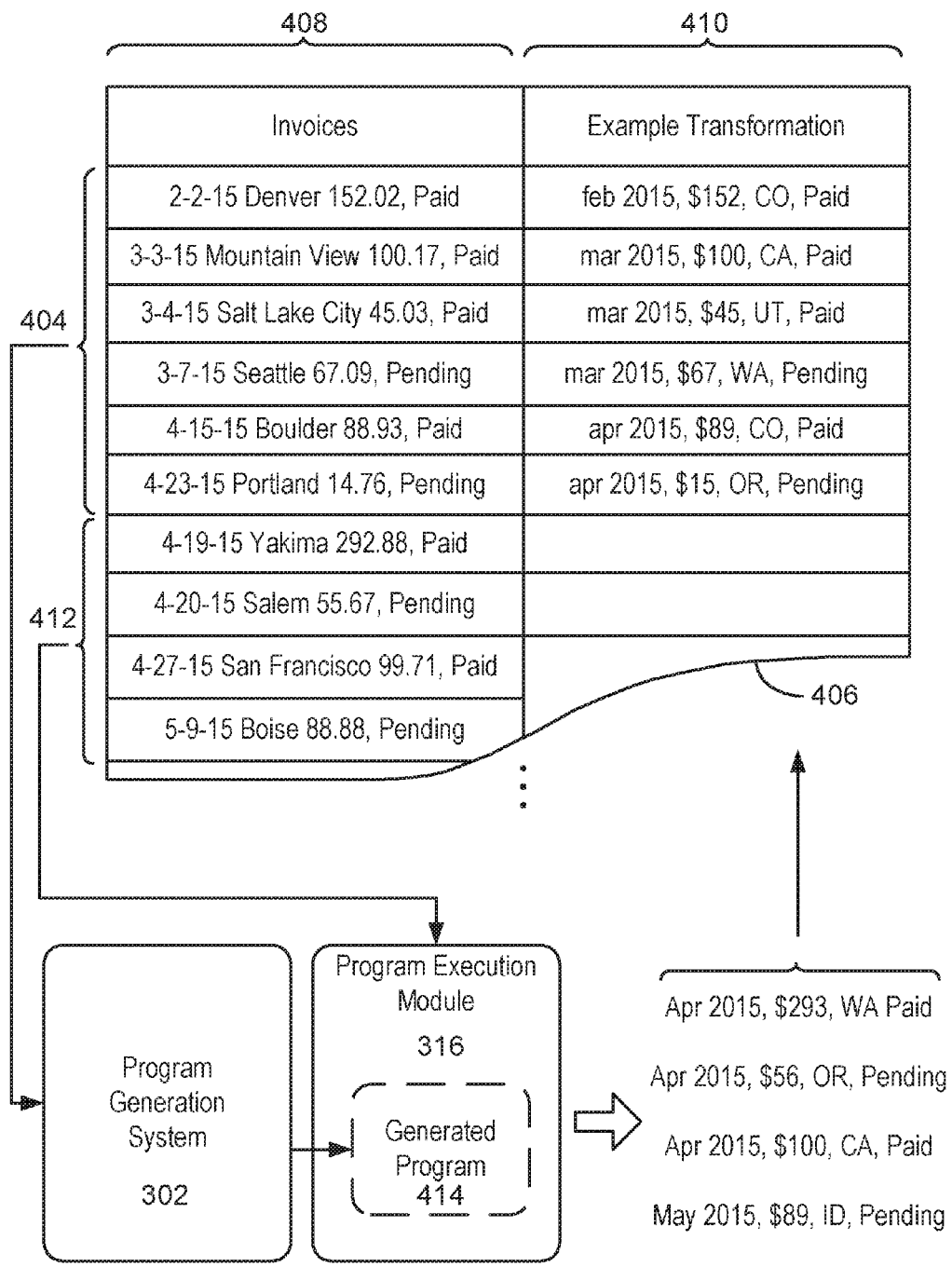
FIG. 4 shows another illustrative usage scenario for creating a program based on input-output examples using the program generation system.

FIG. 4 shows another illustrative usage scenario 400 for creating a program based on input-output examples using the program generation system 302. Like numbered items are as described with respect to FIG. 3. Specifically, FIG. 4 presents an illustrative set of input-output examples 404 within a data file 406. The set of input-output examples 404 includes a number of input items 408 and a number of corresponding output items 410. In this example, the input items 408 include a single column of alphanumeric input information; likewise, the output items 410 include a single column of alphanumeric output information. However, in other cases, a data file 406 can include a single column of input information which maps to two or more columns of output information. In another case, the data file 406 can include two more columns of input information which maps to a single column of output information. In another case, the data file 406 can include two or more columns of input information which maps to two or more columns of output information, and so on. Further, a data file 406 can organize sets of input information and output information in any manner (that is, besides, or in addition to, a columnar organization). More generally stated, the example shown in FIG. 4 can be varied in many different ways.

In the particular scenario of FIG. 4, the input items 408 represent invoices in an original format. The output items 410 represent a transformed version of the invoices in an output format. For example, the first input item 408 includes a date in a particular format, i.e., "2-2-15," representing a date of Feb. 2, 2015. The output item 410 transforms this date to another format, that is, by printing an abbreviation of the month name, i.e., "Feb." In addition, the output item 410 transforms the first character of the month abbreviation from uppercase to lowercase, to thereby yield "feb." The first input item 408 also includes a name of a city, namely "Denver." The output item 410 transforms this city information into corresponding abbreviated state information, namely "CO." The first input item 408 also includes a cost value in dollars, namely "152.02." The output item 410 repeats this cost value, but rounds the value off to the nearest dollar amount, yielding "152." The first input item 408 also includes a string "Paid." The output item 410 repeats this string in verbatim fashion.

Further note that the output item 410 for the first input-output example includes additional information that is not present in the corresponding input item 408. For example, the output item 410 includes three commas, whereas the input item 408 only includes a single comma. Further, the output item 410 adds a dollar sign "$" in front of the cost figure "152." Further, the output item 410 arranges information in a different manner compared to the corresponding input item 408. For example, the input item 408 places the location information, i.e., "Denver," prior to the cost information, i.e., "152.02," whereas the output item 410 places the cost information, i.e., "152," before the location information, i.e., "CO." Finally, the output item 410 renders the last string, i.e., "Paid," in boldface, whereas it is not presented in boldface in the input item 408. As can be appreciated, this particular example is presented merely for explanation purposes. Other input-output examples 404 can vary from this scenario in any manner.

The data file 406 also includes another set of untransformed input items 412 that do not yet have corresponding output items. Manually generating the output items for the set of untransformed input items 412 may be impractical due to the size and complexity of the data file 406. To address this issue, the program generation system 302 automatically generates a program 414 that assists the user in transforming the set of input items 412 into a desired output form. From a high level perspective, the program generation system 302 generates the program 414 based on the set of input-output examples 404 using cues relating to the input items 408 and the corresponding output items 410. A program execution module 316 then applies the generated program 414 to the set of new input items 412. This yields a set of new output items. For example, the program 414 automatically transforms the new input item "4-19-15 Yakima 292.88, Paid" to "apr 2015, $293, WA, Paid."

Figure 5:
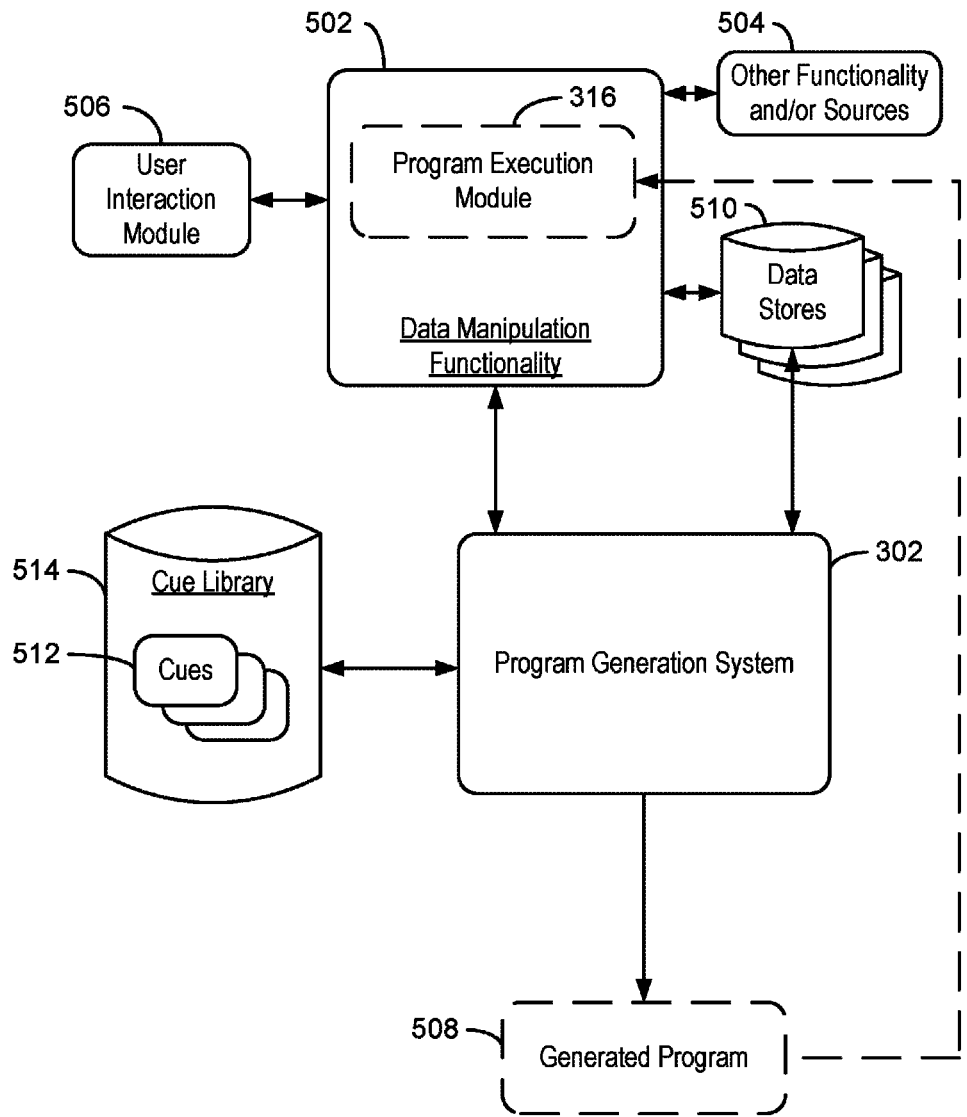
FIG. 5 is a block diagram of a data manipulation system for generating a program for performing a task via the program generation system.

FIG. 5 is a block diagram of a data manipulation system 500 for generating a program for performing a task via the program generation system 302. Like numbered items are as described with respect to FIG. 3. As shown in FIG. 5, the program generation system 302 may operate in conjunction with any type of data manipulation functionality 502. The data manipulation functionality 502 may be any tool for performing processing on data items. For example, in some embodiments, the data manipulation functionality 502 is a spreadsheet system that allows a user to manipulate data items in tabular form. One spreadsheet system that can be used is Microsoft Office Excel® provided by Microsoft® Corporation of Redmond, Wash. In other embodiments, the data manipulation functionality 502 is a table manipulation functionality within a document editing application.

The data manipulation functionality 502 may interact with other functionalities and/or sources 504. For example, the data manipulation functionality 502 may receive data items from the other functionalities and/or sources source 504, or send data items to the other functionalities and/or sources 504. The other functionalities and/or sources 504 may include application modules of any type, such as a document editing application, a spreadsheet application, or the like. Alternatively, or in addition, the other functionalities and/or sources 504 may include network-accessible entities of any type. For example, the other functionalities and/or sources 504 may include collections of data items maintained in remote data stores, accessible via the Internet.

A user interaction module 506 may provide an interface by which a user or other entity may interact with the data manipulation functionality 502 and the program generation system 302. In some embodiments, for instance, the user interaction module 506 provides a graphical user interface (GUI) that allows a user to interact with the data manipulation functionality 502 and the program generation system 302. More specifically, in some embodiments, the user interacts with the program generation system 302 through an interface provided via the data manipulation functionality 502. In other embodiments, the user directly interacts with the services provided by the program generation system 302. FIG. 2 depicts the user interaction module 506 as a distinct module with respect to the data manipulation functionality 502 and the program generation system 302 to facilitate explanation. This represents one possible implementation. In another implementation, the data manipulation functionality 502 and/or the program generation system 302 may incorporate the user interaction module 506 as a component thereof.

In any case, the user interaction module 506 includes functionality that accommodates different modes of interacting with the program generation system 302. In these modes, the user can provide various forms of feedback to the program generation system 302. Such feedback may allow the program generation system 302 to improve the performance of a generated program 508. Further, the user interaction module 506 can include an optional natural language interaction module (not shown) that can provide natural language messages to the user. One such type of message may explain the logic that the program 508 is using to convert input items to corresponding output items.

In operation, the user may feed a collection of input-output examples to the data manipulation functionality 502. For example, in some embodiments, the user manually creates a set of input-output examples. In other embodiments, the user instructs the data manipulation functionality 502 to read in a data file that contains the input-output examples. The data file can be obtained from any sources, such as the other functionalities and/or sources 504, which may represent local sources and/or remote sources with respect to the data manipulation functionality 502. Upon instruction, the data manipulation functionality 502 can use the program generation system 302 to provide the generated program 508. The generated program 508 expresses the logic embodied in the input-output examples. The program execution module 316 can then use the program 508 to automatically process new input items to generate new output items.

FIG. 5 shows the data manipulation functionality 502 and program generation system 302 as two distinct respective modules. In another case, the data manipulation functionality 502 may incorporate the program generation system 302 as one of its components, or vice versa. Likewise, FIG. 5 shows the program execution module 316 as a component within the data manipulation functionality 502. In another case, the data manipulation functionality 502 and the program execution module 316 may represent two distinct modules.

The data manipulation functionality 502 may invoke the program generation system 302 in different modes. In one mode, the user may expressly invoke the functionality of the program generation system 302, e.g., by activating a command button, menu item, or the like, provided by the user interaction module 506. The user may then expressly identify a set of input-output examples for use in generating the program 508.

In another mode, the data manipulation functionality 502 can include detection functionality that detects that the user is repetitively performing the same type of transformation on a collection of input items to provide corresponding output items. The data manipulation functionality 502 can then automatically invoke the program generation system 302 based on the input-output examples that the user has already supplied.

These usage modes are representative rather than exhaustive. The data manipulation functionality 502 may interact with the program generation system 302 in yet other modes of operation.

The user may directly or indirectly invoke the program generation system 302 to accomplish different data manipulation objectives. In a first scenario, the user can invoke the program generation system 302 when there is some environment-specific desire to convert information expressed in a first format into information expressed in a second format. For example, in one case, the user may receive information from another entity in a first format. The user may desire to transform this information into a second format that is more acceptable to the user, based on any environment-specific considerations. In another case, the user himself may have created the information in the first format. The user may now desire to transform the information into the second format. In another case, the user may receive information from a source application, data store, or the like, expressed in the first format. The user may desire to convert this information into a second format that is more suitable for a target application, data store, or the like. For example, the user may desire to convert information from a format used by a document editing application to a format used by spreadsheet application, or vice versa. In another case, the user may desire to convert information expressed in a markup language format, e.g., XML, HTML, or the like, to a non-markup language format. These examples are presented by way of illustration, not limitation.

In a second scenario, the user may directly or indirectly invoke the program generation system 302 for the primary purpose of extracting one or more data items from input items obtained from any source. In this scenario, the second format represents a subset of information expressed in the first format.

In a third scenario, the user may directly or indirectly invoke the program generation system 302 based on a combination of reasons associated with the first scenario and the second scenario. For example, in addition to extracting information from the input items, the user may desire to perform any type of transformation on the extracted information. The user may also add information to the output items that has no counterpart in the input items.

The above-described data manipulation scenarios are representative rather than exhaustive. The user may invoke the program generation system 302 to accomplish yet other data manipulation objectives.

In terms of physical implementation, the various modules and systems shown in FIG. 5 can be implemented by one or more computing devices. These computing devices can be located at a single location or can be distributed over plural locations. For example, in some embodiments, a local data manipulation functionality 502 interacts with a local program generation system 302 to perform the functions summarized above. In other embodiments, a local data manipulation functionality 502 interacts with a remote network-implemented program generation system 302 to implement the functions described herein. Further, the various modules and systems shown in FIG. 5 can be administered by a single entity or plural entities.

Any type(s) of computing device(s) can be used to implement the functions described in FIG. 5. For example, a personal computing device, workstation computing device, laptop computing device, personal digital assistant device, mobile telephone device, game console device, set-top box device, server computing device, or the like, may be used to implement such functions.

The program generation system 302 and the data manipulation functionality 502 can also interact with one or more data stores 510. The data stores 510 can store previously-specified input-output examples, previously-generated programs, and the like. In some embodiments, the program generation system 302 identifies relevant input-output examples 528 relating to the parts of the input items and the parts of the output items within the data store 510.

In addition, the program generation system 302 may identify a number of cues 512 relating to the input items and the output items. In some embodiments, a cue library 514 includes a collection of cues 512. Each cue 512 may be used to provide a number of rules, e.g., functions or constants, for obtaining the specific part of the output items from the corresponding part of the input items. Therefore, such cues 512 may aid the program generation system 302 in the creation of the program 508.

Method for Generating a Program for Performing a Task

Figure 6:
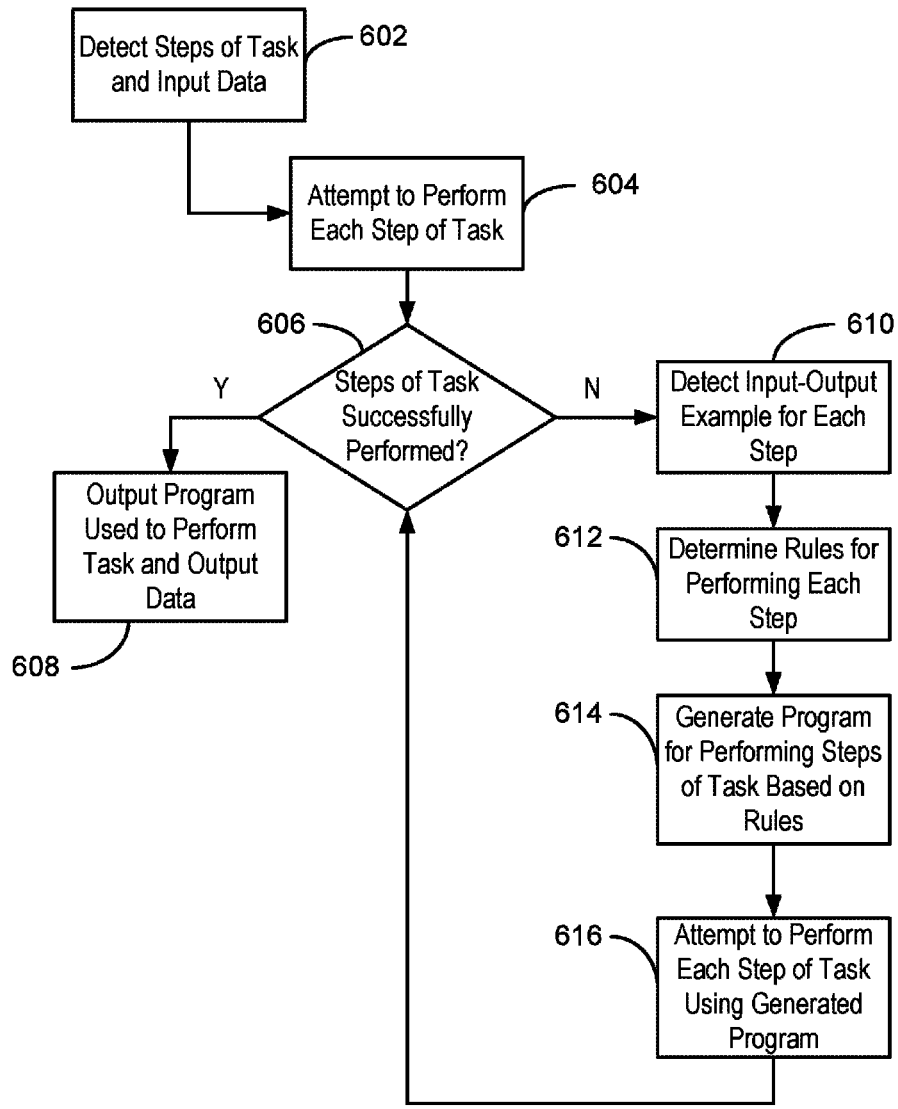
FIG. 6 is a process flow diagram of a method for generating a program for performing a task using input-output examples.

FIG. 6 is a process flow diagram of a method 600 for generating a program for performing a task using input-output examples. In various embodiments, the task is a text processing task. However, the task may also be any other suitable type of task that transforms input data into corresponding output data.

The method 600 may be performed by a data manipulation system of a computing device, such as the data manipulation system 500 discussed above with respect to FIG. 5. For example, the program may be generated by the program generation system 302, and the task may be performed by the data manipulation functionality 502 using the generated program. Moreover, the method 600 may also be performed by any other type of data manipulation system that is configured to generate a program and use the program to perform a task.

The method begins at block 602, at which steps of a task, as well as input data for the task, are detected by a data manipulation system. In some embodiments, the steps of the task and the input data are input into the data manipulation system by a user of the computing device. However, the steps of the task and the input data may be also be input into the data manipulation system via any other local or remote entity, or may be determined by the data manipulation system automatically.

At block 604, the data manipulation system attempts to perform each step of the task. The data manipulation system may attempt to perform the steps of the task using an existing program that is included within the system. The existing program may be a program that was previously generated by the data manipulation system, or may be a program that was included within the original functionality of the data manipulation system. Such an existing program may be particularly useful for performing simple tasks without creating an entirely new program.

At block 606, a determination is made about whether the steps of the task have been successfully performed. If it is determined that the steps of the task have been successfully performed, the data manipulation system outputs the program that was used to perform the task and the resulting output data at block 608.

If it is determined that the steps of the task have not been successfully performed, the data manipulation system detects one or more input-output examples corresponding to each step at block 610. In some embodiments, the input-output examples are input into the data manipulation system by a user of the computing device. However, the input-output examples may be also be input into the data manipulation system via any other local or remote entity, or may be determined by the data manipulation system automatically based on input-output examples stored within the system. In addition, the input-output examples may be based on hypothetical data or real data, or both.

At block 612, the data manipulation system determines one or more rules for performing each step. Such rules include compositions of functions and constants that may be used to perform each step of the task. The rules may be determined based on the input-output examples. For example, one or more rules may be determined for transforming input data for a particular input-output example into the corresponding output data. The output data may be any type of transformation of the input data. For example, the output data may be entirely different than the input data, or may be the exact same data in a different format.

In various embodiments, the rules are determined based on cues within the input data and the output data for the input-output examples, as well as cues within the input data for performing the task. Such cues may include specific features of the input data and the output data. For example, if the length of the input data matches the length of the corresponding output data, rules that involve sorting, e.g., sort functions, are likely to be involved in the transformation. As another example, if there is a date within the input data, rules that relate to dates are likely to be involved in the transformation.

In some cases, multiple alternative rules are determined for a particular step. In such cases, the rules may be ranked according to the probability that each rule will result in a successful transformation of the input data. The cues relating to the input data and the output data may be used to rank the rules.

At block 614, the data manipulation system generates a program for performing the steps of the task based on the rules. Generating the program may involve combining the rules for each step of the task. In some embodiments, the rules are combined in a specified order according to the order of executing the steps. In other embodiments, if the order of executing the steps has not been specified, a systematic enumeration of rule combinations can be performed to identify the desired program.

In some embodiments, if there are multiple alternative rules for performing any of the steps of the task, a number of candidate programs are generated. The candidate programs may involve transforming the input data in different ways to obtain the same (or similar) output data. The candidate programs may be ranked based, at least in part, on the rankings of the rules included within each program. A specific program for performing the task may then be chosen from the list of candidate programs. The program may be chosen by a user via a user interface, for example, or may be chosen automatically by the data manipulation system.

At block 616, the data manipulation system attempts to perform each step of the task using the generated program. Once the data manipulation system has attempted to perform each step of the task, the method 600 proceeds to block 606, at which it is determined whether the steps of the task have been successfully performed. Thus, the method 600 may be repeated until an appropriate program has been generated for completing the task.

It is to be understood that the method 600 is not intended to indicate that the steps of the method 600 are to be executed in any particular order, or that all of the steps of the method 600 are to be included in every case. Further, any number of additional steps not shown in FIG. 6 may be included within the method 600, depending on the details of the specific implementation.

In various embodiments, according to the method 600, a user provides data in the form of an input string x, as well as an input-output pair $(x_M, y_M)$, each of which are strings. The input-output pair $(x_M, y_M)$ may be described herein as a mock, or hypothetical pair of strings. However, the input-output pair $(x_M, y_M)$ may also be a pair of real strings. The mock input-output pair may succinctly represent the transformation the user desires to perform. According to the method 600, the data manipulation system may perform an inference given $(x, x_M, y_M)$ to output a transformation $f(\bullet)$ that may be used to represent the relationship between the mock input-output pair. When applied to the input string x, the transformation may yield the desired output string.

Given a reasonably expressive space of transformations, there will be multiple competing explanations for going from $x_M \rightarrow y_M$. Intuitively, it is desirable to choose the transformation that provides the simplest explanation. To achieve this, the popularity of a rule may be determined based on a corpus of training triplets. The popularity of a rule may be determined by the fraction of times the rule is part of a transformation successfully explaining the relationship between the input string and the output string. The popularity of a rule may be constrained to examples that share one or more basic structural properties. These structural properties may be summarized through the use of cues, as discussed above. The cues may be used to determine the probability that a transformation will be useful. In addition, an inference procedure may be performed by assessing the probabilities of various rules given the cues that are observed in the provided $(x, x_M, y_M)$ triplet. The inference procedure may include a brute-force search over the context-free grammar in order of rules with decreasing probability.

According to the program generation procedure described herein, there exists a corpus of T training examples, $z^{(1)}, \ldots, z^{(T)}$. Each $z^{(t)}$ is a four-tuple $(x_M^{(t)}, y_M^{(t)}, x^{(t)}, y^{(t)}) \in \mathcal{S}^4$, representing the mock input-output pair and the actual input-output pair, respectively. For each training example $z^{(t)}$, it is assumed that there exists some transformation $f^{(t)}: \mathcal{S} \rightarrow \mathcal{S}$ within some concept space $\mathcal{F}$ that explains both the mock input-output pair and the actual input-output pairs, that is, $f^{(t)}(x_M^{(t)})=y_M^{(t)}$ and $f^{(t)}(x^{(t)})=y^{(t)}$. For example, one such training four-tuple is shown below in Eqs. 1 and 2.

$$(x_M, y_M) = (acb, abc) \quad (1)$$

$$(x,y) = (\text{gamma nu alpha}, \text{alpha gamma nu}) \quad (2)$$

Based on this corpus, it may be desirable to learn some parameter $\theta$ that characterizes the distribution $\Pr[f|x, x_M, y_M; \theta]$, which is the posterior probability of a transformation given the mock input-output pair and the actual input-output pair. The posterior probability defines how likely it is that the transformation explains the relationship between the given mock input-output pair. This can be cast as the optimization of the objective shown below in Eqs. 3 and 4.

$$\min_\theta \sum_{t=1}^{T} (\Delta(f^{(t)}(x_M^{(t)}), y_M^{(t)}) + \Delta(f^{(t)}(x^{(t)}), y^{(t)})) \quad (3)$$

$$f^{(t)} = \text{argmax}_f Pr[f \mid x^{(t)}, x_M^{(t)}, y_M^{(t)}; \theta] \quad (4)$$

According to Eq. 4, $\Delta(\cdot,\cdot)$ measures the discrepancy between two strings. In some embodiments, $\Delta(x, x')=1$ when $x \neq x'$ may be used. The objective is to correctly predict both the mock output and the actual output given the corresponding input, assuming that the appropriate transformation is used under the set of parameters $\theta$. The code fragment shown below provides an overview of the operation of the transformation module of the program generation system.

```
{Train on corpus to get parameters θ̂}
Initialize parameters θ₀
for t = 1 ... T do
    Perform brute-force enumeration over PCFG, find candidate
    transforms F'⁽ᵗ⁾
    Update counts Succ(r,t) and Trials(r,t) for each rule in F'⁽ᵗ⁾
end for
```

```
Compute θ̂ based on aggregated counts
{Given a test mock-pair (x'_M,y'_M) and data x', infer transformation f̂}
Find Sugg(x',x'_M,y'_M), the set of suggested rules
Compute normalized rule probabilities based on Sugg(x',x'_M,y'_M)
Perform brute-force enumeration over PCFG in order of estimated
    probability, and return first solution f:f (x'_M) = y'_M
```

To perform the optimization, the loss component may be minimized, and the solution may be pushed towards the constraint set. First, for each training example $z^{(t)}$, a set of functions $F^{(t)} = \{f^{(t)}: \mathcal{S} \rightarrow \mathcal{S}\}$ that explains both the mock input-output pairs and the actual input-output pairs may be found. This is performed according to a search procedure that uses information in the initial parameter guess, $\theta_0$. The explicit enumeration may be performed over all functions in decreasing order of $\Pr[f|x, x_M, y_M; \theta_0]$. In practice, $\theta_0$ may be initially picked to produce a uniform distribution over transformations.

The resulting solutions may minimize the loss component of the objective function. The probabilities of these transforms may then be increased by deriving a new estimate for $\hat{\theta}$ that has higher probability for these transformations. The whole procedure may be iterated using the newly derived $\hat{\theta}$ as an initialization. New candidate functions $F'^{(t)}$ may be discovered by virtue of $\hat{\theta}$, providing a more reasonable ranking over transformations. In addition, for a given corpus, the resulting estimate $\hat{\theta}$ may be used as an initial guess when given additional training examples.

At test time, a triplet $(x'_M, y'_M, x')$ is given. The goal is to infer a likely function $\hat{f}$ that explains the data, given the parameters learned from the training phase, and use this to derive the conjectured output on $x'$, as shown below in Eq. 5.

$$\hat{y}' = \hat{f}(x') \quad (5)$$

where $$\hat{f} = \text{argmax}_f Pr[f \mid x', x'_M, y'_M; \hat{\theta}] \cdot \Delta(f(x'_M), y'_M)$$

To perform this, all candidate transformations may be enumerated in order of decreasing probability in order to find a transformation that explains the relationship between the mock input-output pair.

It may be assumed that the space of transformations $\mathcal{F}$ is the set of valid traces derived from a probabilistic context free grammar $\mathcal{G}$, such as the one shown below in Eqs. 6-9.

$$E \rightarrow \text{concat}(E,E) \quad (6)$$

$$E \rightarrow \text{remove\_char}(E,E) \quad (7)$$

$$E \rightarrow \text{select\_field}(E,E) \quad (8)$$

$$E \rightarrow \langle \text{input} \rangle \quad (9)$$

The terminal symbols in this grammar may be taken to be strings in $\mathcal{S}$. Each rule $r: E \rightarrow \alpha$ in $\mathcal{G}$ may have an associated probability $\Pr[r; \theta]$ of being generated. Each rule r may also be associated with a function $f_r: \mathcal{S} \text{NArgs}(r) \rightarrow \mathcal{S}$, where NArgs(r) denotes the number of arguments in the RHS of rule r. For example, the rule $E \rightarrow \text{concat}(E, E)$ may correspond to a function $f:(x_1, x_2) \mapsto \text{concat}(x_1, x_2)$.

A transformation $f$ may now be a trace of a nonterminal E. For example, the derivation E→concat(E→⟨input⟩, E→⟨input⟩) may denote the transformation $f(x)=x\oplus x$. Thus, the final function $f$ may be the composition of the functions corresponding to the rules in the grammar $f(\bullet)=f_{r_1}(f_{r_2}(\ldots f_{r_k}(\bullet)))$. According to this structure, the probability of a transformation is the product of the probabilities of its constituent rules, as shown below in Eqs. 10 and 11.

$$Pr[f \mid x, x_M, y_M; \theta] = \prod_{k=1}^{K} Pr[f_{r_k} \mid x, x_M, y_M; \theta] \quad (10)$$

$$= \prod_{k=1}^{K} Pr[r_k \mid x, x_M, y_M; \theta], \quad (11)$$

A reasonable model for $Pr[r_k|x, x_M, y_M; \theta]$ may be designed. This may be accomplished by summarizing the strings as a real-valued vector by measuring various characteristics of the strings. This summarization idea forms the basis for the use of cues to determine rules for performing a task.

The learning process may exploit the fact that the chance of a rule being part of an explanation for (x, y) depends greatly on certain characteristics in the structure of x and y. For example, if x and y have the same number of lines, then it becomes more likely that the for_each_line rule will be used. As discussed above, these characteristics may be referred to as cues. The goal is to determine how the cues affect the likelihoods of specific rules.

A cue status function $c(x_M, y_M, x)=(c_1(x_M, y_M, x), \ldots, c_K(x_M, y_M, x))$ may be defined, where K is the total number of cues. The kth cue is a function $c_k: S \to \{0,1\}$ that, given an input triplet, returns whether the kth property holds for the triplet. As an example, $c_1$ may be "Does the input contain a substring that looks like a date?" It may be assumed that this collection of cue statuses contains all the information for computing the probability of a rule, as shown below in Eq. 12.

$$Pr[r|x,x_M,y_M;\theta]=Pr[r|c(x,x_M,y_M);\theta] \quad (12)$$

Conceptually, such a scheme may seem reasonable. However, in practice, there is a limited training data with a potentially large number of cues. Determining the relationships between every possible (rule, cue) combination is thus a difficult task. In particular, note that the above will attempt to measure the success probability of a rule given that some cues do not fire. Conceptually, such a strategy seems overly ambitious. For example, it may involve measuring the chance that a cue for dates not firing increases the likelihood of a rule for XML documents being useful.

To cut down the number of parameters to estimate, each cue may be endowed with a set of suggested rules. That is, each cue may specify which rules are to be given consideration if the cue is active. Thus, each cue involves (rule, cue) combinations, where the rule is suggested by the cue. All other rules may be effectively disregarded, which conceptually corresponds to setting a posterior probability of some very small $\epsilon$. This scheme may be a means of regularization through hard sparsification of the learned parameters $\theta$.

Formally, there exists a function Sugg: $\{1, \ldots, K\} \to 2^{\mathcal{R}}$ which, given an index to the cue list, returns a set of rules that are suggested by that cue being active. For example, if a cue checks whether the input contains tabs but the output does not, then it may suggest a rule that removes tabs. This information can be encoded in a binary vector $s(x, x_M, y_M) \in \{0,1\}^{|\mathcal{R}|}$, whose rth element says whether or not the rth rule is suggested by any cue. The probability form may be further constrained such that the probability of a rule being successful only depends on the set of rules that are suggested. It may be assumed that a rule is disregarded if it is not suggested, i.e., the rule has zero probability of being useful. Of interest then is the probability of success given suggestion, which is defined below in Eq. 13.

$$Pr[r|x,x_M,y_M;\theta]=(s(x,x_M,y_M))_r \cdot Pr[r|s(x,x_M,y_M);\theta] \quad (13)$$

The goal is to estimate $Pr[r|s(x, x_M, y_M); \theta]$, assuming that $(s(x, x_M, y_M))_r > 0$. To do this, a probability for each $r \in \mathcal{R}$ may be found, where s has $2^{\mathcal{R}}$ elements. Thus, even a simple linear model for the probabilities includes $2^{\mathcal{R}} |^2$ parameters, which is prohibitive if there are a large number of rules. Therefore, the probability model may be further simplified by ignoring interactions between rules and estimating a single parameter. Two simple models are considered based on this assumption. According to the first model, the probability is directly assigned to a parameter, as shown below in Eq. 14.

$$Pr[r|s(x,x_M,y_M);\theta]=\theta_r \quad (14)$$

According to the second model, the odds-ratio of the probability is modeled with one parameter, as shown below in Eq. 15.

$$\frac{Pr[r \mid s(x, x_M, y_M); \theta]}{1 - Pr[r \mid s(x, x_M, y_M); \theta]} = \theta_r \quad (15)$$

The estimation of $\theta$ according to second model can be performed in the same manner as for the first model, and then a simple transformation may be applied, as shown below in Eq. 16.

$$Pr[r \mid s(x, x_M, y_M); \theta] = \phi_r := \frac{1}{1 - \theta_r} - 1 \quad (16)$$

Thus, $\theta_r$ may be estimated as in the first model.

Recall that, for every training example, the set $F^{(t)}$ contains all transformations that correctly explain the relationship between both the mock input-output pair and the actual input-output pair. The probability of a rule being useful may be determined by counting the fraction of times that the rule was part of a correct transformation, given that it was suggested, as shown below in Eqs. 17 and 18.

$$\hat{\theta}_r = \frac{\sum_{t=1}^{T} 1[r \in Sugg^{(t)}] \cdot 1[r \in F^{(t)}]}{\sum_{t=1}^{T} 1[r \in Sugg^{(t)}]} \quad (17)$$

$$:= \frac{\sum_{t=1}^{T} Succ(r, t)}{\sum_{t=1}^{T} Trials(r, t)} \quad (18)$$

This may be the maximum likelihood estimate of the parameter $\theta_r$. This estimate may be noisy if a rule is suggested only a few times. In addition, a rule may borrow strength from similar rules. For example, two separate cues may generate the rules selectField(input, "\n") and selectField(input, "\t"). These rules may be part of the selectField family. Therefore, in the absence of sufficient data, the $\theta$ estimates for the rules may be assumed to be similar.

Another example of this is a cue that generates a constant string based on the data. A specific constant, such as "Dr." is unlikely to be very common in general. However, its estimate may borrow strength from all instances of a constant rule. In particular, a rule class Class(r) may be associated with each rule r in the grammar. The parameter $\theta_{Class}(r)$ may be defined to be the success rate of any rule belonging to that class, as shown below in Eq. 19.

$$\hat{\theta}_{Class(r)} = \frac{\sum_{t,r: Class(r)=c} Succ(r, t)}{\sum_{t,r: Class(r)=c} Trials(r, t)} \qquad (19)$$

The next step may involve imposing a Beta $$\left(\alpha \frac{\hat{\theta}_{Class(r)}}{1 - \hat{\theta}_{Class(r)}}, 1\right)$$

prior to each parameter $\theta_r$. The maximum a posteriori (MAP) estimate of $\theta_r$ may then be defined according to Eq. 20.

$$\hat{\theta}_r = \frac{\sum_{t=1}^{T} Succ(r, t) + \alpha \frac{\hat{\theta}_{Class(r)}}{1 - \hat{\theta}_{Class(r)}}}{\sum_{t=1}^{T} Trials(r, t) + \alpha \frac{1}{1 - \hat{\theta}_{Class(r)}}} \qquad (20)$$

Observe that, if Trials(r, t)=0, i.e., if a rule is never suggested, the model may fall back to the estimate $\hat{\theta}_{Class(r)}$ of the parent class. The parameter α tunes the tradeoff between the likelihood and prior, and may be chosen using cross-validation.

In various embodiments, the grammar may be allowed to be ambiguous, and popular compositions of rules may be inferred. Allowing the grammar to be ambiguous provides for specializations of a rule to have different probabilities than the basic rule. For example, consider a rule like E→selectField(E, Dlm, Int), which performs the operation of selecting a particular field from the given expression, using the given delimiter to tokenize. Fields can be selected from an expression based on tab delimiters if the rule Dim→"\t" is used. In an ambiguous grammar, the rule E→selectField(E, "\t", Int) can also be used, and it can be given a different probability compared to its more general rule. This effectively gives the rule Dim→"\t" a different probability depending on whether or not it is invoked as part of a selectField.

Such specializations can be suggested manually as part of the cues. To some extent, such specializations can also be determined automatically from the system in an obvious way. For example, for each rule r corresponding to a function $f_r$ ($x_1$, $x_2$, . . . , $x_m$), common instantiations of the arguments may be found among the successful transformations. If selecting fields is generally done using tabs, for example, then this can be inferred by this simple popularity scheme. The new composite rules can be added to the system, inheriting the cues of the parent rules, and probabilities can be learned for the new composite rules.

Figure 7:
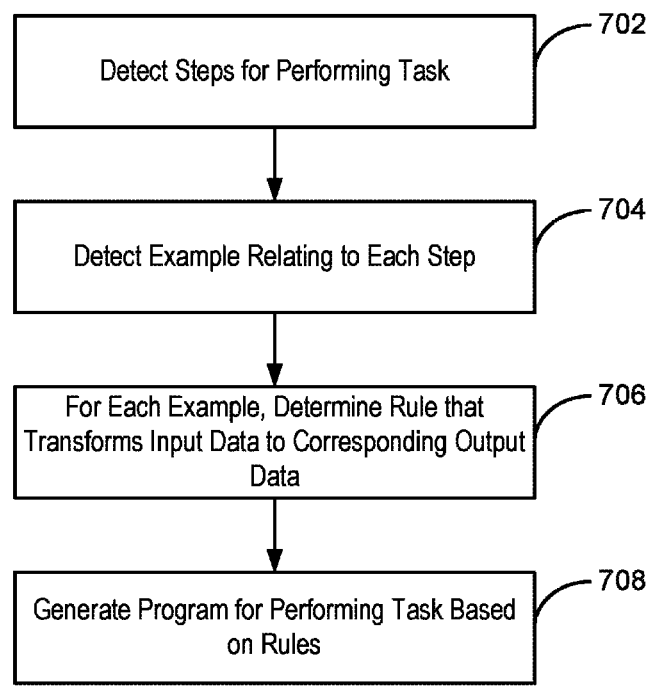
FIG. 7 is a simplified process flow diagram of a method for generating a program for performing a task.

FIG. 7 is a simplified process flow diagram of a method 700 for generating a program for performing a task. The method 700 may be performed by any computing device that includes a data manipulation system, such as the data manipulation system 500 discussed above with respect to FIG. 5. In addition, the task may include any type of data manipulation task, such as, for example, a text processing task.

The method begins at block 702, at which a number of steps for performing a task are detected. The steps may be detected in response to input from a user, or may be automatically determined based on the type of task that is to be performed.

At block 704, an example relating to each step is detected. The example may be detected in response to input from a user, or may be automatically determined based on the type of task that is to be performed. The example includes input data and corresponding output data relating to the step. The example may be a mock example including hypothetical input data and corresponding hypothetical output data, or may be an authentic example including real input data and corresponding real output data.

In various embodiments, the input data and the output data may be in the form of strings of data. Thus, the strings may be converted to lists based on any type of delimiter, such as, for example, a newline or a tab. This may simplify the method 700 by allowing operations to be defined on lists and applied on an element-by-element basis. In some embodiments, the strings are converted into lists based on the detected steps of the task.

At block 706, for each example, a rule that transforms the input data to the corresponding output data is determined. Such rules are determined based on cues within the input data and the corresponding output data. The rules may include functions or constants. The cues may be extensible cues that are located within a library on the computing device, and may be determined according to textual features of the input data and the corresponding output data.

In various embodiments, for each example, a number of rules that transform the input data to the corresponding output data are determined based on the cues within the input data and the corresponding output data. A probability that each rule will transform actual input data for the task to desired output data is estimated based on weights for corresponding cues. The weights for the cues may relate to the reliabilities of the cues. The rules for each example may be ranked based on the probability for each rule. A rule to be used to perform the step represented by the example may be determined based on the ranking of the rules. In addition, in some embodiments, a number of rules may be chosen to perform a particular step of the task.

In addition, in some embodiments, multiple examples are detected for each step. Multiple examples may be used, for example, to validate the rule learned from one example, or may be used to select from among multiple rules learned from one example.

At block 708, a program is generated for performing the task based on the rules for the examples. The program may be generated by combining the rules in a particular manner, such as, for example, in a particular order. In various embodiments, a number of suggested programs are generated for each task, and a user may be allowed to choose a program to be used to perform the task via a user interface. In some embodiments, the program to be used to perform the task may be automatically determined according to specific rankings of the suggested programs. The rankings of the suggested programs may be based, at least in part, on the rankings of the rules for the examples relating to the various steps of the task.

It is to be understood that the method 700 is not intended to indicate that the steps of the method 700 are to be executed in any particular order, or that all of the steps of the method 700 are to be included in every case. Further, any number of additional steps not shown in FIG. 7 may be included within the method 700, depending on the details of the specific implementation. For example, the task may be performed by transforming the actual input data for the task into the desired output data using the generated program.

The method 700 may utilize any of a variety of different rules to generate the program. For example, a rule may include splitting a given string into a list based on a delimiter. A rule may include creating a string by appending all elements in a list using a delimiter. Another rule may include selecting a given field from a list using a delimiter to tokenize. Another rule may include sorting elements in a given list, or sorting every element in a list based on a given field using a delimiter to tokenize. In addition, another rule may include removing all empty elements from a list, or removing all elements from a list containing an expression as a substring. Further, another rule may include merging together elements in a list until a pattern is encountered.

The method 700 may also utilize any of a variety of different rules to determine the rules for generating the program. For example, a cue may include checking if the input data has numbers, but the output data does not have numbers. A cue may include checking if a delimiter is only in the input data. Another cue may include checking if there is a date-like object in the input data or the output data. Another cue may include checking if each row of the input data is a substring of a row of the output data. In addition, another cue may include checking if the input data matches the output data after some string has been replaced by another string.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method for generating a program, comprising:
    identifying a plurality of cues associated with input data and corresponding output data, wherein the cues comprise one or more textual features of the input data and the corresponding output data;
    determining a plurality of rules to transform the input data to the corresponding output data, based on the cues;
    determining a probability that each of the plurality of rules transforms the input data to the corresponding output data;
    determining a relative sort order for each of the rules based on the determined probability;
    presenting a user interface comprising a representation of the rules based on the relative sort order, and a selection input field for each of the rules; and
    generating a program comprising one or more rules that are selected via the selection input field.

2. The method of claim 1, comprising generating an additional program to transform additional input data to additional corresponding output data.

3. The method of claim 1, wherein at least one of the rules is associated with a document editing program.

4. The method of claim 1, wherein the program performs an additional transformation of additional input data to additional output data.

5. The method of claim 1, wherein generating the program comprises combining the rules in a predetermined order.

6. The method of claim 1, wherein the user interface enables manual entry of the input data.

7. The method of claim 1, wherein the user interface enables manual entry of the corresponding output data.

8. A program generation system, comprising:
    a processor that is adapted to execute stored instructions; and
    a system memory, the system memory comprising code configured to:
    identify a plurality of cues associated with input data and corresponding output data, wherein the cues comprise one or more textual features of the input data and the corresponding output data;
    determine a plurality of rules to transform the input data to the corresponding output data, based on the cues;
    determine a probability that each of the transforms the input data to the corresponding output data;
    determine a relative sort order of each of the rules based on the determined probability;
    present a user interface comprising a representation of the relative sort order of each of the rules, and a selection input field for each of the rules; and
    generate a program comprising one or more rules that are selected via the selection input field, wherein the program is generated by combining the rules in a predetermined order.

9. The system of claim 8, the system memory comprising code configured to generate an additional program to transform additional input data to additional corresponding output data.

10. The system of claim 8, wherein at least one of the rules is associated with a document editing program.

11. The system of claim 8, wherein the program performs an additional transformation of additional input data to additional corresponding output data.

12. The system of claim 8, wherein the user interface enables manual entry of the input data and the output data.

13. One or more computer-readable hardware memory devices for storing computer-readable instructions, the computer-readable instructions providing a program generation system that, when executed by one or more processing devices:
    identifies a plurality of cues associated with input data and corresponding output data, wherein the cues comprise one or more textual features of the input data and the corresponding output data;
    determines a plurality of rules to transform the input data to the corresponding output data, based on the cues;
    determines a probability that each of the rules transforms the input data to the corresponding output data;
    determines a relative sort order for each of the rules based on the determined probability;
    presents a user interface comprising a representation of the rules based on the relative sort order, and a selection input field for each of the rules; and
    generates a program comprising one or more rules that are selected via the selection input field, wherein the program is generated by combining the rules in a predetermined order, and wherein the user interface enables manual entry of the input data and the output data.

14. The computer-readable hardware memory devices of claim 13, wherein the program generation system generates an additional program to transform additional input data to additional corresponding output data.

15. The computer-readable hardware memory devices of claim 13, wherein at least one of the rules is associated with a document editing program.

16. The computer-readable hardware memory devices of claim 13, wherein the program performs an additional transformation of additional input data to additional corresponding output data.

17. The computer-readable hardware memory devices of claim 13, wherein the program generation system generates an additional program to:

transform additional input data to additional corresponding output data.

* * * * *